Dec. 18, 1956  LE ROY C. LAUNDRY  2,774,520
VALVE MECHANISM
Filed Nov. 4, 1955
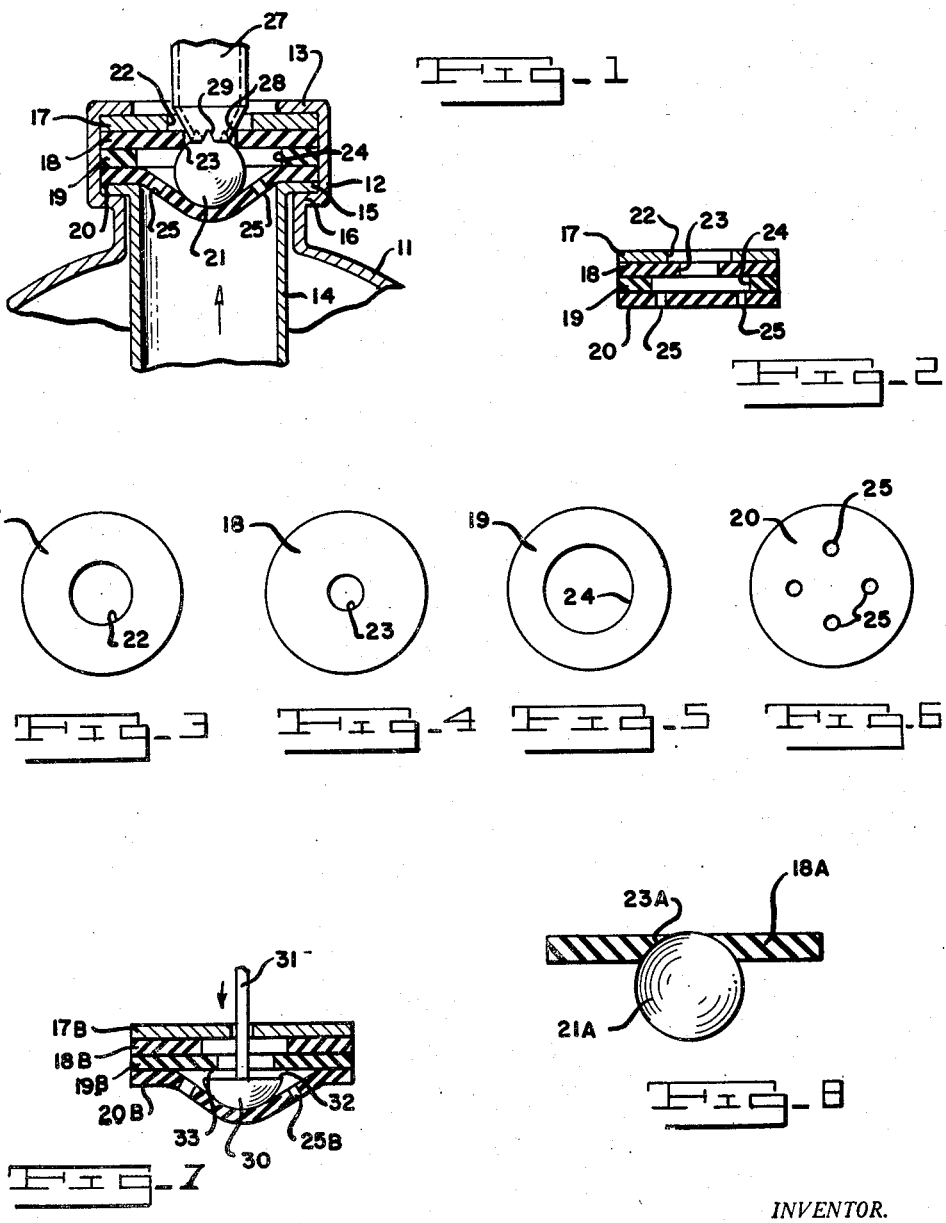
INVENTOR.
LE ROY C. LAUNDRY
BY Edward M. Apple
ATTORNEY United States Patent Office 2,774,520
Patented Dec. 18, 1956

2,774,520

VALVE MECHANISM

Le Roy C. Laundry, Birmingham, Mich.

Application November 4, 1955, Serial No. 544,912

6 Claims. (Cl. 222—394)

This invention relates to a valve mechanism and has particular reference to a valve which is suitable for use on aerosol type cans, blow-guns, toilets, and in other applications where it is necessary to control a fluid under direct pressure.

An object of the invention is to generally improve valve mechanisms and to provide a valve mechanism, which is simple in construction, economical to manufacture, and a valve which will provide positive control under pressure.

Another object of the invention is to provide a valve mechanism which requires no adjustments, when once assembled and put into use.

Another object of the invention is to provide a valve mechanism which is composed of a minimum number of working parts, and is so constructed and arranged that the use of metal springs and like parts is entirely eliminated.

Another object of the invention is to provide a valve mechanism, in which the valve is completely enclosed in a flexible housing, one portion of which normally urges the valve against the seat, to help maintain the seal.

Another object of the invention is to provide a valve mechanism for use with fluids under pressure, in which the valve is seated under the influence of the fluid pressure, and an auxiliary pressure which is exerted by a portion of the housing.

The foregoing and other objects and advantages of the invention will become more apparent as the description proceeds, reference being made from time to time to the accompanying drawing forming part of the within disclosure, in which drawing:

Fig. 1 is a fragmentary sectional view of a device embodying the invention.

Fig. 2 is a vertical section taken through the valve housing with the valve removed.

Fig. 3 is a top plan view of the rigid washer, comprising the uppermost element in the valve housing illustrated in Fig. 2.

Fig. 4 is a top plan view of the flexible washer, comprising the second from the top element in the valve housing shown in Fig. 2.

Fig. 5 is a top plan view of the flexible washer, comprising the third from the top element in the valve housing shown in Fig. 2.

Fig. 6 is a top plan view of the flexible apertured disc, comprising the fourth from the top element in the valve housing shown in Fig. 2.

Fig. 7 is a modified form of the invention, in which a semi-circular element, having an integral push rod, is employed as the valve, instead of the ball, as shown in Fig. 1.

Fig. 8 is a modified form of the invention, in which a curved surface is employed as the valve seat, instead of a line contact, as illustrated in Fig. 1.

Referring now more particularly to the drawing, it will be understood that in the embodiment herein disclosed, the reference character 11 indicates the wall of a can, having a neck portion 12, with an inturned flange 13, which serves as a retaining element for the valve mechanism embodying the invention. A tube 14, having an outwardly directed flange 15, which rests on the shoulder 16, formed in the walls of the can, is directed into the interior of the can, so that the contents of the can, which is under pressure, may be delivered therethrough, in the direction of the arrow, upon the opening of the valve mechanism, which I will now describe.

The valve mechanism, in general, consists of a top rigid washer-like element 17, two flexible washer-like elements 18 and 19, an apertured disc member 20, and a ball 21, which serves as the valve. The washer 17 is preferably made of a hard, rigid material, such as metal, fiber, or hard rubber or plastic, and is provided with an opening 22, the diameter of which is preferably larger than the diameter of the ball valve 21. The washers 18 and 19, the apertured disc 20, are preferably made of an elastic material, such as rubber, neoprene, or other plastic. The opening 23 in the washer 18 is smaller than the diameter of the ball valve 21, so that it may serve as a valve seat, when the valve 21 is held against the edge of the opening 23, under the influence of the fluid pressure on the inside of the tube 14, which pressure is assisted by the elasticity of the apertured disc 20. The opening 24 in the member 19, is of a diameter greater than the ball valve 21, and is of sufficient diameter to clear the apertures 25 formed in the disc 20, as shown in Fig. 1. When the device is assembled as shown in Fig. 1, the ball valve 21, is entirely enclosed within, and surrounded by, the elements 18 and 19 and 20, except at the opening 23 in the member 18. It will be noted than when the elements are in the position shown in Fig. 1, the elastic, apertured, disc 20 is under tension. This tension on the disc 20, together with the upward pressure indicated by the arrow, urges the ball valve 21 against the bottom of the opening 23, to effect a tight seal between the elements 18 and 21. The greater the internal pressure in the can, and the greater the tension on the disc 20, the stronger will be the seal between the ball valve 21 and the member 18.

In Fig. 1, I have shown the opening 23 in the element 18, as having a vertical wall, which effects a more or less, line contact between the member 18 and the ball 21, whereas in Fig. 8 the member 18A is provided with a curved wall opening 23A, which provides a surface contact between the element 18A and the ball 21A. This modified form would be advantageous in any application where extremely high pressures were used on the inside of the can.

Although I have shown the flexible elements 18, 19 and 20 of the valve mechanism in the form of separate elements, it will be understood that they could be molded integrally, with the same openings, as indicated in Figs. 1 to 6 inclusive. In the construction shown in Figs. 1 to 6 inclusive, the members 17, 18 and 19 and 20 may be secured together along their contacting surfaces by cement, or by vulcanizing, or by other suitable means, or their edges may be compressed together to prevent leakage, by exerting sufficient pressure thereon, between the flange 13, the flange 15 and the shoulder 16.

In assembling the valve mechanism as shown in Fig. 1, the ball valve 21 may be set in position before the members 17 and 18 are positioned, although I prefer to first assemble the elements 17, 18, 19 and 20, as shown in Fig. 2, and then press the ball valve 21 through the opening 22 and 23, after the parts have been assembled. This is possible because the diameter of the opening 22, in the rigid member 17, and the diameter of the opening 24, in the flexible member 19 are greater than the diameter of the ball 21. This permits the temporary distortion of the opening 23, in the member 18, to permit the ball 21 to pass through the opening 23, at the same time causing the downward distortion of the center of the apertured disc 20, as shown in Fig. 1.

When the elements are in the position shown in Fig. 1, the contents of the can 11 are sealed against leakage. When it is then desired to remove some of the fluid from the can 10, the ball valve 21 is moved downwardly, and out of contact with the flexible member 18. Downward thrust on the ball 21 is effected by the tubular member 27, which has a tapered end 28, of a suitable outside diameter, to pass through the opening 23 in the flexible member 18. The lower edge of the tapered end 28 is truncated, and is provided with cut-outs 29, so that when the ball 21 is moved off the seat at 18, the contents of the can under pressure may rise in the tube 14, pass through the apertures 25 and around the ball 21 through the opening 23 and into the openings 29 to the interior of the tube 27 from which they are discharged. As downward thrust is exerted on the tube 27, the tapered walls 28 will effect a seal with the upper wall of the opening 23 so that the contents of the can cannot leak around the outside of the tube 27.

Although I have illustrated in Fig. 1 the use of a ball valve 21, it will be understood that a semi-circular valve element 30, having a push or thrust rod 31 secured thereto, may be employed with equal facility. In such a modified form the seal is effected between the flat edge 32, of the semi-spherical element 30, and the flat surface 33 of the member 19B. In this modification the diameter of the opening in the member 17B is only large enough to accommodate the rod 31, so that it may serve as a guide for the rod 31. In the modified form shown in Fig. 7, I prefer to set the rigid element 17B in position after the other parts 18B, 19B, 20B and 30 have been assembled. It will be noted that in Fig. 7 the valve is open, so that the contents of the can may be exhausted through the openings 25B and through the openings found in the members 19B, 18B and 17B. Otherwise the device functions as does the structure shown in Fig. 1.

It is believed that the operation of the device is obvious from the foregoing description.

Having described my invention what I claim and desire to secure by Letters Patent is:

1. A valve mechanism comprising a resilient housing having the least one thin stretchable wall, under tension, with a ball valve in contact therewith, another wall of said housing having an opening therein which serves as a valve seat for said ball, said ball being normally held on said seat by the tension of said first named wall, and said first named wall of said housing having a plurality of apertures therein.

2. The structure of claim 1, including a rigid member in contact with said ball and having a central opening therein positioned concentric with the opening comprising said valve seat.

3. A valve mechanism comprising in combination, an apertured stretchable disc under tension, a ball valve in contact with said disc, a flexible washer overlying said disc with its opening in communication with the apertures of said disc, a second flexible washer overlying said first washer and having an opening smaller than the diameter of said ball valve, which opening acts as a seat for said valve, and a rigid washer overlying said second washer, said rigid washer having an opening larger than the diameter of said ball valve.

4. The structure of claim 3, including a receptacle having a neck portion, with a tubular element extending from said neck portion into said receptacle, means on said neck portion for securing said valve mechanism, and tubular means for moving said ball valve off said seat, distorting said disc and discharging the contents of said receptacle through said valve seat.

5. The structure of claim 3, including a receptacle having a neck portion, with a tubular element extending from said neck portion into said receptacle, means on said neck portion for securing said valve mechanism, and means for moving said ball valve off said seat and distorting said disc, said last named means comprising a tubular element with a truncated, conical end, there being openings in said end in communication with the interior of said valve seat.

6. A valve mechanism comprising in combination, an apertured, stretchable, flexible disc, a semi-spherical element in contactable relation with and under the pressure of said disc, a push rod secured to said element, a flexible washer having an opening less than the diameter of said element, arranged face to face with said disc, a second flexible washer having an opening larger than the diameter of said element in face to face contact with said first washer, and a rigid member super-imposed on said second washer and having an opening therein which serves as a guide for said push rod.

References Cited in the file of this patent

UNITED STATES PATENTS

| | | |
|---|---|---|
| 116,433 | Glover | June 27, 1871 |
| 2,304,257 | Jilbert | Dec. 8, 1942 |
| 2,643,799 | Countryman | June 30, 1953 |
| 2,658,714 | Fooshee | Nov. 10, 1953 |
| 2,682,977 | Spiess et al. | July 6, 1954 |
| 2,735,592 | Stranger | Feb. 21, 1956 |